(12) United States Patent
Tsai

(10) Patent No.: US 7,926,962 B2
(45) Date of Patent: Apr. 19, 2011

(54) PORTABLE ELECTRONIC DEVICE

(75) Inventor: Ching-Sen Tsai, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 97 days.

(21) Appl. No.: 12/430,989

(22) Filed: Apr. 28, 2009

(65) Prior Publication Data

US 2010/0142179 A1   Jun. 10, 2010

(30) Foreign Application Priority Data

Dec. 8, 2008  (CN) .......................... 2008 1 0306027

(51) Int. Cl.
*G03B 15/02* (2006.01)
*F21V 5/00* (2006.01)
(52) U.S. Cl. ...................... 362/16; 362/311.06; 362/330; 362/339; 396/176
(58) Field of Classification Search .............. 362/3, 16, 362/330, 217.02, 339, 311.06, 520, 521, 362/522; 396/61, 62, 175, 176, 267; 359/707, 359/737, 837
See application file for complete search history.

(56) References Cited

U.S. PATENT DOCUMENTS

| | | | | |
|---|---|---|---|---|
| 1,478,680 A | * | 12/1923 | Soderberg | 362/333 |
| 3,681,591 A | * | 8/1972 | Loch | 362/217.02 |
| 4,071,750 A | * | 1/1978 | Schneppendahl et al. | 362/217.03 |
| 4,172,273 A | * | 10/1979 | Schilling et al. | 362/19 |
| 5,530,628 A | * | 6/1996 | Ngai | 362/33 |
| 5,617,163 A | * | 4/1997 | Ohtake | 396/176 |
| 6,467,931 B2 | * | 10/2002 | Tenmyo | 362/223 |
| 6,554,451 B1 | * | 4/2003 | Keuper | 362/237 |
| 2008/0260372 A1 | * | 10/2008 | Shin | 396/176 |

* cited by examiner

Primary Examiner — Jong-Suk (James) Lee
Assistant Examiner — David R Crowe
(74) Attorney, Agent, or Firm — Steven M. Reiss

(57) ABSTRACT

A portable electronic device includes a main body, a camera positioned in the main body, a fill-in light emitting unit positioned in the main body adjacent to the camera, and an optical lens positioned between the fill-in light emitting unit and outside of the main body. The optical lens includes an incident surface facing the fill-in light emitting unit, a light emitting surface opposite to the incident surface, and a plurality of elongated V-shaped ridges formed on the incident surface. The elongated V-shaped ridges are substantially parallel to each other and symmetrical about a central portion of the optical lens. Vertex angles between symmetric elongated V-shaped ridges progressively increase along a direction away from the fill-in light emitting unit.

12 Claims, 3 Drawing Sheets

PORTABLE ELECTRONIC DEVICE

CROSS-REFERENCE TO RELATED APPLICATIONS

This application is related to a co-pending U.S. patent application Ser. No. 12/389,492, filed on Feb. 20, 2009, and entitled "DIFFUSING LENS AND ILLUMINATION ASSEMBLY USING SAME". The inventor of the co-pending application is Ching-Sen Tsai. The co-pending application has the same assignee as the present application. The specification and drawings of the co-pending applications are incorporated in their entirety herein by reference

BACKGROUND

1. Technical Field

The present invention relates to portable electronic devices and, particularly, to a camera assembly for use in portable electronic device with a fill-in light emitting unit.

2. Description of the Related Art

Portable electronic devices, such as mobile phones, are now equipped with camera modules for taking photographs. These portable electronic devices usually include a fill-in light emitting unit for providing an extra amount of light in low light conditions.

A typical camera assembly of a mobile telephone includes a lamp cover, a fill-in light emitting unit, a camera and a transparent plate. The fill-in light emitting unit can be a light emitting diode. The fill-in light emitting unit, the camera and the lamp cover are positioned in the mobile telephone. The fill-in light emitting unit is usually adjacent to the camera, and the lamp cover is positioned under the fill-in light emitting unit. The transparent plate is positioned on the fill-in light emitting unit to protect the fill-in light emitting unit from contamination. The lamp cover concentrates the light. The light emitted from the fill-in light emitting unit travels through the transparent plate and lightens the object.

At the time the image is captured, the light emitted from the fill-in light emitting unit travels through the transparent plate and lightens the object. However, the image captured has an uneven luminance distribution in appearance, because the fill-in light emitting unit is a point light source, and a central portion of the object facing the fill-in light emitting unit is brighter than other portions of the object.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
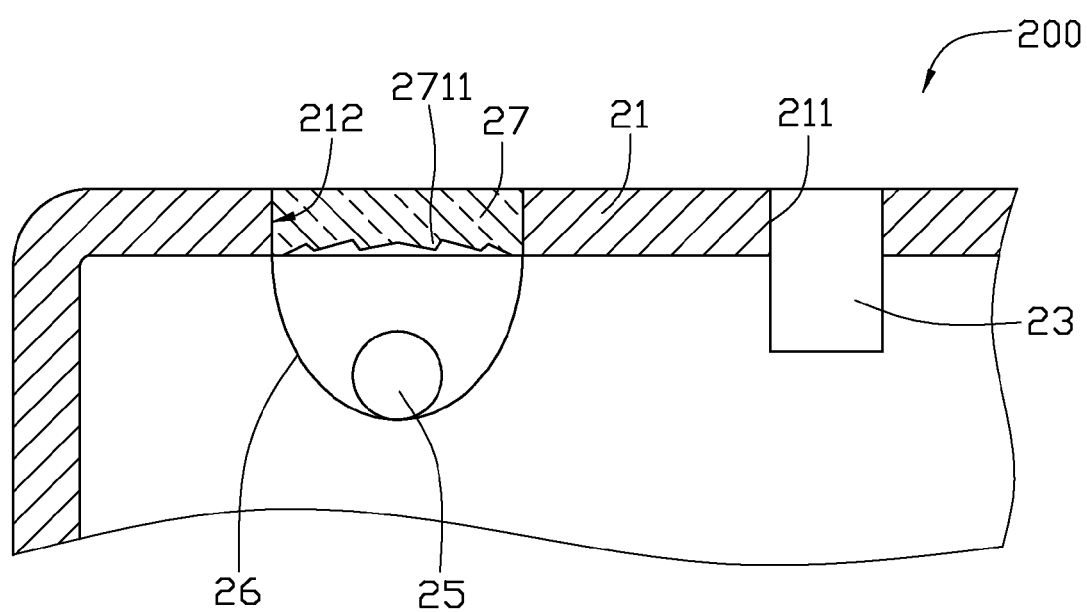
FIG. 1 is a partial, cross-sectional view of an embodiment of a portable electronic device, the portable electronic device including a main body, a fill-in light emitting unit, a camera, a lamp cover and an optical lens.

Referring to FIG. 1, an embodiment of a portable electronic device 200 includes a main body 21, a camera 23, a fill-in light emitting unit 25, a lamp cover 26 and an optical lens 27. In one embodiment, the portable electronic device 200 may be a mobile telephone, and the fill-in light emitting unit 25 is a light emitting diode. The main body 21 defines a first through hole 211 and a second through hole 212 adjacent to the first through hole 211.

The camera 23, the fill-in light emitting unit 25 and the lamp cover 26 are positioned in the main body 21, and the fill-in light emitting unit 25 is adjacent to the camera 23. The camera 23 is inserted into the first through hole 211. The optical lens 27 is positioned in the second through hole 212 and coplanar with the main body 21. The lamp cover 26 is positioned below the fill-in light emitting unit 25 and partially surrounding the fill-in light emitting unit 25. The lamp cover 26 has a reflective inner surface for reflecting light emitted from the fill-in light emitting unit 25.

Figure 2:
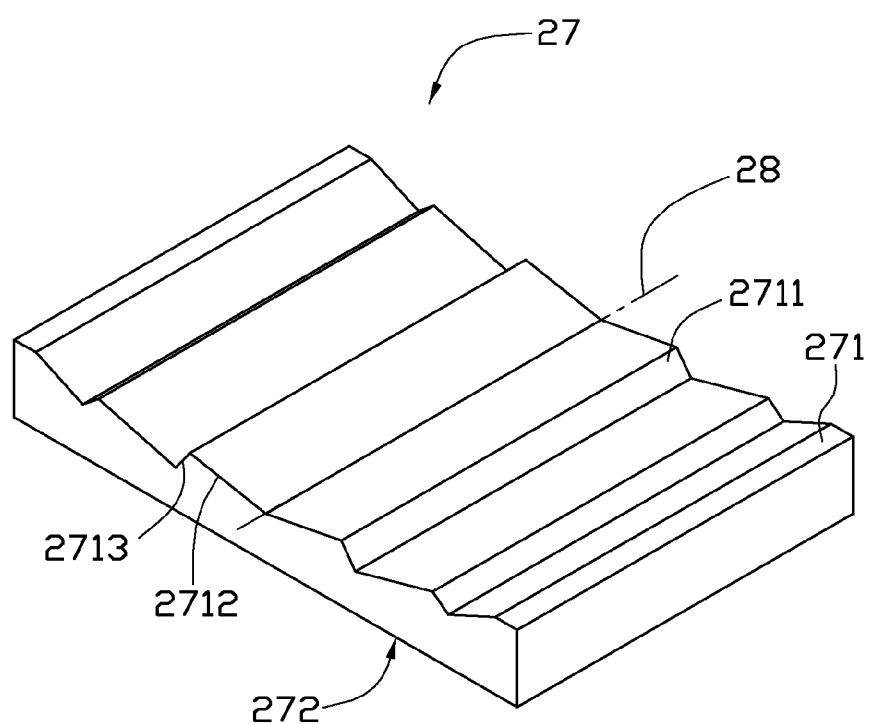
FIG. 2 is an isometric view of the optical lens of the portable electronic device of FIG. 1.

Referring to FIG. 2, the optical lens 27 includes a first surface 271, a second surface 272 opposite to the first surface 271, and a plurality of elongated V-shaped ridges 2711 formed on the first surface 271. In this embodiment, the second surface 272 may be flat. The elongated V-shaped ridges 2711 may be substantially parallel to each other. The first surface 271 is an incident surface, and the second surface 272 is a light emitting surface. The optical lens 27 has a central line 28. The plurality of elongated V-shaped ridges 2711 may be distributed symmetrically relative to the central line 28. Each ridge 2711 includes two slopes 2712, 2713 connected to each other.

Figure 3:
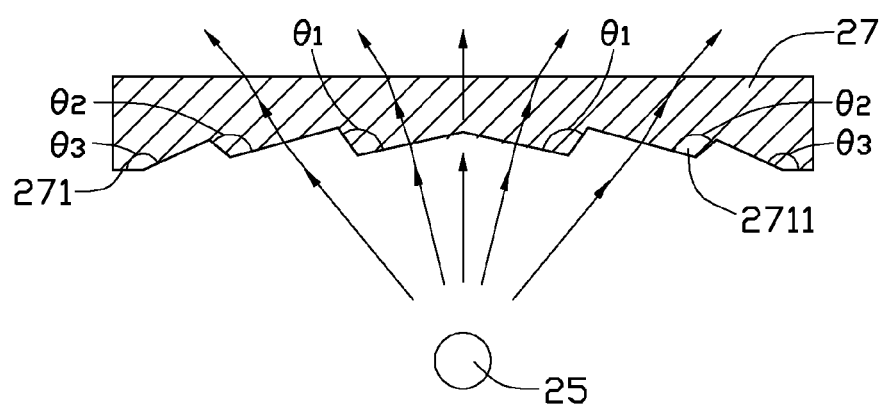
FIG. 3 is a cross-sectional view of the optical lens shown in FIG. 2 with a plurality of light travelling through the optical lens.

Referring to FIG. 3, a cross-section plane of the elongated V-shaped ridges 2711 taken along a direction perpendicular to an extending direction of the elongated V-shaped ridges 2711 is shown. Vertex angles $\theta_1/\theta_2/\theta_3$ are respectively formed between the slopes 2712, 2713 of each ridge 2711. The vertex angles $\theta_1$, $\theta_2$, $\theta_3$ are obtuse and the further the distance between the vertex angles and the central line 28, the larger the vertex angle. Accordingly, the refraction ability of the ridges 2711 becomes weaker with increasing distance from the central line 28.

When using the portable electronic device 200 (shown in FIG. 1) in low light conditions, the fill-in light emitting unit 25 can be turned on, such that the light emitted from the fill-in light emitting unit 25 travels though the optical lens 27 and lightens the object. The camera 23 will capture image of the object. The light emitted from the fill-in light emitting unit 25 enters the optical lens 27 and scatters to the two sides of the optical lens 27, such that the emitting luminance of a central portion of the optical lens 27 would be weakened and the emitting luminance of a side portion would be enhanced. Thus, the image of the object captured by the portable electronic device 200 would have a nice appearance. Since the vertex angles $\theta_1$, $\theta_2$, $\theta_3$ are obtuse angles, the elongated V-shaped ridges 2711 have a high strength and are easy to fabricate.

Finally, while the embodiments have been described and illustrated, the present disclosure is not to be construed as being limited thereto. Various modifications can be made to the embodiments by those of ordinary skilled in the art without departing from the true spirit and scope of the embodiments as defined by the appended claims.

What is claimed is:

1. A portable electronic device, comprising:
   a main body,
   a camera positioned in the main body;
   a fill-in light, emitting unit positioned in the main body adjacent to the camera; and
   an optical lens positioned between the fill-in light emitting unit and outside of the main body, wherein the optical lens comprises an incident surface facing the fill-in light emitting unit, a light emitting surface opposite to the incident surface, and a plurality of elongated V-shaped ridges formed on the incident surface, the elongated V-shaped ridges are parallel to each other and are symmetrical relative to a central line of the optical lens; each ridge including two slopes which form a vertex angle there between, the vertex angles being obtuse angles and further the distance between the vertex angles and the central line, the larger the vertex angle.

2. The portable electronic device of claim 1, wherein the light emitting surface of the optical lens and two fringes of the incident surface are flat.

3. The portable electronic device of claim 1, wherein the main body defines a first through hole and a second through hole adjacent to the first through hole; the camera receives light from the first through hole and the fill-in light emitting unit emits light via the second through hole.

4. The portable electronic device of claim 3, wherein the optical lens is positioned in the second through hole.

5. The portable electronic device of claim 1, further comprising a lamp cover positioned in the main body, and partially surrounding the fill-in light emitting unit.

6. The portable electronic device of claim 5, wherein the lamp cover has a highly reflective inner surface.

7. The portable electronic device of claim 1, wherein the fill-in light emitting unit is a light emitting diode.

8. A portable electronic device, comprising:
a main body,
a camera attached to the main body;
a fill-in light emitting unit attached to the main body adjacent to the camera; and
an optical lens comprising an incident surface facing the fill-in light emitting unit, a light emitting surface opposite to the incident surface, and a plurality of elongated V-shaped ridges formed on the incident surface; the light emitting surface being flat; the elongated V-shaped ridges being substantially parallel to each other; the optical lens including a central line and the V-shaped ridges being symmetrical relative to the central line; each ridge including two slopes which form a vertex angle there between, the vertex angles being obtuse angles and the further the distance between the vertex angles and the central line, the larger the vertex angle.

9. The portable electronic device of claim 8, wherein the main body defines a first through hole and a second through hole adjacent to the first through hole; the camera receives light from the first through hole and the fill-in light emitting unit emits light via the second through hole.

10. The portable electronic device of claim 9, wherein the optical lens is positioned in the second through hole.

11. The portable electronic device of claim 9, further comprising a lamp cover positioned in the main body, and partially surrounding the fill-in light emitting unit.

12. The portable electronic device of claim 11, wherein the lamp cover has a highly reflective inner surface.

* * * * *